United States Patent
Hintemann et al.

(10) Patent No.: US 12,378,128 B2
(45) Date of Patent: Aug. 5, 2025

(54) METHOD FOR PRODUCING AEROGELS AND AEROGELS OBTAINED USING SAID METHOD

(71) Applicant: Fraunhofer Gesellschaft zur Förderung der angewandten Forschung e.V., Munich (DE)

(72) Inventors: Damian Hintemann, Stadtlohn (DE); Andreas Kilzer, Witten (DE); Nils Mölders, Mülheim an der Ruhr (DE); Manfred Renner, Essen (DE); Andreas Sengespeick, Minden (DE); Eckhard Weidner, Bochum (DE); Oliver Weishaupt, Gladbeck (DE)

(73) Assignee: Fraunhofer Gesellschaft zur Förderung der angewandten Forschung e.V., Munich (DE)

( * ) Notice: Subject to any disclaimer, the term of this patent is extended or adjusted under 35 U.S.C. 154(b) by 898 days.

(21) Appl. No.: 17/291,565

(22) PCT Filed: Nov. 6, 2019

(86) PCT No.: PCT/EP2019/080344
§ 371 (c)(1),
(2) Date: May 5, 2021

(87) PCT Pub. No.: WO2020/099201
PCT Pub. Date: May 22, 2020

(65) Prior Publication Data
US 2022/0009786 A1      Jan. 13, 2022

(30) Foreign Application Priority Data

Nov. 13, 2018  (DE) .................... 10 2018 128 410.1

(51) Int. Cl.
*C01B 33/159*    (2006.01)
*B01J 13/00*    (2006.01)
(Continued)

(52) U.S. Cl.
CPC ....... *C01B 33/1585* (2013.01); *B01J 13/0091* (2013.01); *C01B 33/1546* (2013.01);
(Continued)

(58) Field of Classification Search
CPC ............ C01B 33/1585; C01B 33/1546; C01B 33/159; B01J 13/0091; C01P 2004/32; C01P 2004/61; C01P 2006/32
See application file for complete search history.

(56) References Cited

U.S. PATENT DOCUMENTS

| | | | |
|---|---|---|---|
| 3,672,833 A | 6/1972 | Teichner et al. | |
| 4,667,417 A | 5/1987 | Graser et al. | |

(Continued)

FOREIGN PATENT DOCUMENTS

| | | |
|---|---|---|
| CN | 106457193 A | 2/2017 |
| CN | 107206342 A | 9/2017 |

(Continued)

OTHER PUBLICATIONS

Montes et al.("Silica microparticles precipitation by two processes using supercritical fluids", J. of Supercritical Fluids 75 (2013) 88-93). (Year: 2013).*

(Continued)

*Primary Examiner* — Jiangtian Xu
(74) *Attorney, Agent, or Firm* — Sheridan Ross P.C.

(57) ABSTRACT

The invention relates to a method for producing an aerogel under increased pressure, to the aerogel obtained using said method and to their use.

8 Claims, 2 Drawing Sheets

Figure 1:
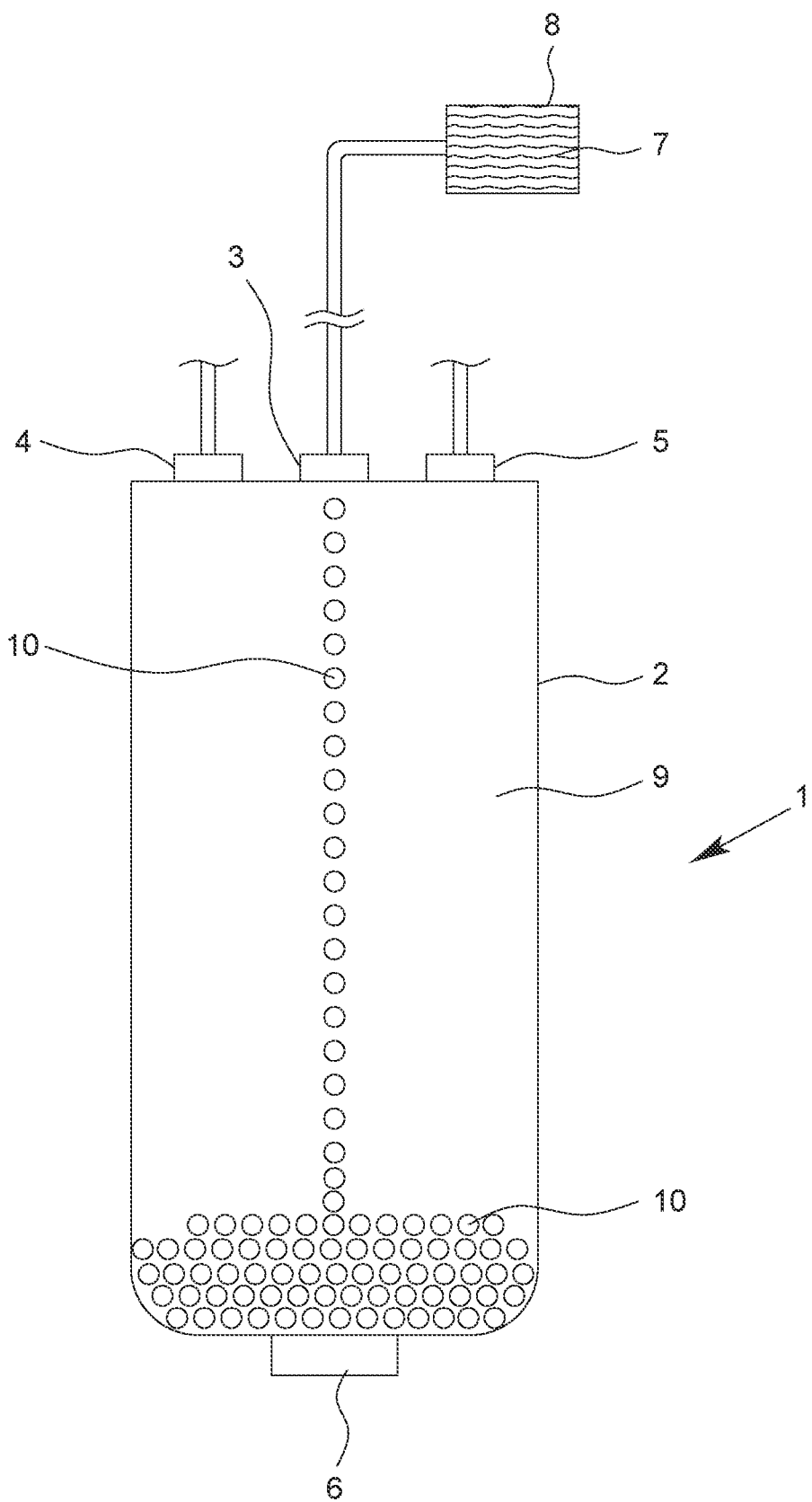

(51) Int. Cl.
  *C01B 33/154* (2006.01)
  *C01B 33/158* (2006.01)
(52) U.S. Cl.
  CPC ........ *C01B 33/159* (2013.01); *C01P 2004/32* (2013.01); *C01P 2004/61* (2013.01); *C01P 2006/32* (2013.01)

(56) References Cited

U.S. PATENT DOCUMENTS

| | | | |
|---|---|---|---|
| 5,705,535 | A | 1/1998 | Jensen et al. |
| 6,129,949 | A | 10/2000 | Schwertfeger et al. |
| 2016/0258153 | A1 | 9/2016 | Koebel et al. |
| 2017/0014792 | A1 | 1/2017 | Bonnardel et al. |
| 2017/0341945 | A1* | 11/2017 | Loelsberg ............. C01B 33/158 |
| 2018/0258249 | A1* | 9/2018 | Fricke ........................ C08J 9/35 |
| 2019/0225498 | A1 | 7/2019 | Ruiz et al. |

FOREIGN PATENT DOCUMENTS

| | | | |
|---|---|---|---|
| DE | 1811353 | A1 | 8/1969 |
| DE | 4316540 | A1 | 11/1994 |
| DE | 19648798 | A1 | 6/1998 |
| DE | 69903913 | T2 | 7/2003 |
| EP | 171722 | A2 | 2/1986 |
| EP | 0849220 | A1 | 6/1998 |
| EP | 3299340 | A | 3/2018 |
| EP | 3478400 | B1 | 9/2020 |
| JP | H10-231116 | A | 9/1998 |
| JP | 2017-536456 | A | 12/2017 |
| WO | WO 99/36170 | | 7/1999 |

OTHER PUBLICATIONS

International Preliminary Report on Patentability for International Application No. PCT/EP2019/080344, mailed May 27, 2021.
Aegerter, Michael A., et al. "Aerogels Handbook; Advances in Sol-Gel Derived Materials and Technologies" Springer; 2011; pp. 118-122.
Hench, Larry L. et al. "Chemical Processing of Advanced Materials" Chemical Processing of Advanced Materials, Wiley, Chichester, 1992, pp. 355-361.
Kistler, S.S. "Coherent Expanded-Aerogels" J. Phys. Chem, 1932, 36(1), pp. 52-64; Jan. 1, 1932.
Klenert, Friederike et al. "Microstructure and Transmittance of Silica Gels for Application as Transparent Heat Insulation Materials" Journal Sol-Gel Science Technol. 75, pp. 602-616, 2015.
Smirnova, Irina et al. "Synthesis of Silica Aerogels: Influence of the Supercritical $CO_2$ on the Sol-Gel Process" Journal of Sol-Gel Science and Technology 28, 175-184; 2003.
Smith, Douglas M., et al. "Preparation of Low-Density Aerogels at Ambient Pressure for Thermal Insulation" Porous Materials, vol. 31, American Ceramic Society, Westerville, 1993, pp. 71-80.
Einarsrud, Mari-Ann et al. "Structural Development of Silica Gels Aged in TEOS" Journal of Non-Crystalline Solids 231; pp. 10-16; 1998.
Kornprobst, Tobias "Aerogele und Photokatalysatoren als Beispiele für Innovative Baumaterialien" Technische Universität München; Dissertation; May 23, 2013.
Moner-Girona, M. et al. "Sol-Gel Route to Direct Formation of Silica Aerogel Microparticles Using Supercritical Solvents" Journal of Sol-Gel Science and Technology 26, 645-649; 2003.
Montes, A., et al. "Silica Microparticles Precipitation by Two Processes Using Supercritical Fluids" The Journal of Supercritical Fluids; vol. 75, pp. 88-93; 2012.
Naik, Sanjeev "High Performance Insulation Based on Nanostructure Encapsulation of Air—Executive Summary" http://www.hipin.eu; Dec. 1, 2015.
Subrahmanyam, Raman et al. "On the Road to Biopolymer Aerogels—Dealing with the Solvent" *Gels* 2015, 1, 291-313.
Twej, Wesam A. A. "Temperature Influence on the Gelation Process of Tetraethylorthosilicate Using Sol-Gel Technique" Iraqi Journal of Science; Jan. 2009.
Wu, Xiaodong et al. "Silica Aerogels Formed from Soluble Silicates and Methyl Trimethoxysilane (MTMS) Using CO2 Gas as a Gelation Agent" Ceramics International, vol. 44, Issue 1, Jan. 2018, pp. 821-829.
International Search Report for International Application No. PCT/EP2019/080344, mailed Feb. 21, 2020.
Written Opinion for International Application No. PCT/EP2019/080344, mailed Feb. 21, 2020.
Alnaief, Mohammad "Process Development for Production of Aerogels with Controlled Morphology as Potential Drug Carrier Systems" Dem Promotionsausschuss der Technischen Universität Hamburg-Harburg zur Erlangung des akademischen Grades Doktor-Ingenieur (Dr.-Ing.) genehmigte Dissertation; Jul. 7, 2011.
Loy, Douglas A. et al. "Direct Formation of Aerogels by Sol-Gel Polymerizations of Alkoxysilanes in Supercritical Carbon Dioxide" Chem. Mater., 9, 2264-2268; 1997.
Sui, Ruohong et al. "Synthesis and Formation of Silica Aerogel Particles by a Novel Sol-Gel Route in Supercritical Carbon Dioxide" J. Phys. Chem. B. 108, 11886-11892; 2004.

* cited by examiner

METHOD FOR PRODUCING AEROGELS AND AEROGELS OBTAINED USING SAID METHOD

CROSS-REFERENCE TO RELATED APPLICATIONS

This application is a national stage application under 35 U.S.C. 371 of PCT Application No. PCT/EP2019/080344 having an international filing date of 6 Nov. 2019, which designated the United States, which PCT application claimed the benefit of German Application No. 10 2018 128 410.1, filed 13 Nov. 2018, each of which are incorporated herein by reference in their entirety.

The present invention relates to the technical field of aerogel production. In particular, the present invention relates to a method for producing an aerogel by means of a sol-gel process.

Furthermore, the present invention relates to aerogels, which in particular are obtainable by the method according to the invention, and to their use, in particular as or in insulation materials.

Furthermore, the present invention relates to an apparatus for producing aerogels.

Finally, the present invention relates to a method for producing a lyogel by means of a solgel process.

Aerogels are highly porous solids whose volume can consist of up to 99.98% pores. Aerogels usually have dendritic structures with a strong branching of the partial chains, so that very many interstices are formed, especially in the form of open pores. The chains have a large number of contact points, so that a stable, sponge-like structure is formed. The pore size is usually in the nanometer range and the internal surface area can be up to 1,000 m$^2$/g or more. Aerogels can be composed of a variety of materials, such as silica, plastic or carbon, as well as natural organic polymers, such as alginates, or metal oxides.

Due to their high porosity, aerogels are often used as insulating materials, for example for thermal insulation purposes, or as filter materials. Similarly, aerogels are also used as storage materials, for example for liquids or gases.

Aerogels are nanostructured, open-pored solids, which are usually produced by means of a sol-gel process.

Aerogels are usually produced by drying a gelatinous gel, mostly condensed silica. The aerogels obtainable with silicas and similar starting materials such as silica sols, silane hydrolysates or silicates have SiO$_2$ structural units and are often referred to as silica aerogels —also called silica aerogels. The first synthesis of silica aerogels was achieved by Steven Kistler in 1931/1932. He was the first to develop a method of drying gels without shrinkage (Kistler S. S., The Journal of Physical Chemistry 1932, 36(1): Coherent expanded Aerogels, pp. 52-64). In the method developed by Kistler, water glass is used as the starting material, from which a silica hydrogel is obtained in a first step by acidification with a mineral acid. In the next step, this gel is freed from alkali metal ions by washing. The water contained in the hydrogel is then completely exchanged for ethanol or methanol. This is followed by supercritical drying of the resulting alcogel in an autoclave.

In the meantime, further processes have been developed, such as the one described in DE 18 11 353 A. DE 18 11 353 A discloses a process for the production of silica aerogels, wherein tetraethoxysilane (TEOS) is hydrolyzed in methanol or ethanol with a precisely metered amount of water and a catalyst. During hydrolysis, an SiO$_2$ gel in the form of an alcogel is formed under alcohol and water splitting. The alcohol gel is then dried supercritically in an autoclave. This method can also be used to produce organic aerogels from melamine formaldehyde resins and resorcinol formaldehyde resins. In supercritical drying techniques, the gel to be dried is subjected to temperature and pressure conditions at which at least the critical point of the solvent used is reached.

The disadvantages of such supercritical drying processes, which are based on supercritical conditions of the solvent used, are the temperature and pressure conditions and a discontinuous mode of operation. For example, drying of water-containing gels requires temperatures of at least 370° C. and pressures of at least 220 bar. When drying gels containing methanol, temperatures of at least 240° C. and pressures of at least 81 bar are required.

An alternative to this supercritical drying process is the use of compressed carbon dioxide. A method for drying with supercritical carbon dioxide is disclosed in EP 171 722 A, for example. In this process, the organic solvent is exchanged for liquid carbon dioxide prior to supercritical drying. Supercritical drying with CO$_2$ then takes place at much lower temperatures, for example at the critical temperature of 31.1° C. and the critical pressure of 73.9 bar of the carbon dioxide.

In addition, subcritical drying processes are also known. In the subcritical drying technique, the gel to be dried is subjected to temperature and pressure conditions that are below the critical point of the solvent used, preferably at normal pressure. The disadvantages of subcritical drying at normal pressure with the addition of heat by contact or convection are that the resulting capillary forces lead to collapse of the gel. This danger exists in particular with hydrogels or lyogels with a low solids content, as is known, for example, from DE 43 16 540 A.

Because of the low equipment and energy requirements, methods for subcritical drying on an industrial scale have already been developed specifically for silica aerogels. Usually, however, the gel has to be chemically modified to reduce the capillary forces occurring during drying and to prevent the gel from collapsing.

One way to modify the silica gel network for drying under normal conditions is to silanize the Si—OH groups in the pore surfaces. Silanizing agents used for this purpose include chlorotrimethylsilane and hexamethyldisilazane. This prevents Si—O—Si bridges from forming between the approaching pore walls during drying. Thus, the shrinkage that occurs is reversible to a certain extent. In addition, by choosing the appropriate solvent, with low surface tension, such as pentane, the forces on the gel network can be minimized. This drying procedure was developed in 1992 by Desphande et al. (cf. D. M. Smith, R. Desphande, C. J. Brinker in: Ishizaki, K., Sheppard, L., Okada, S., Hamesa-ki, T., Huybrechts, B. (eds.), Porous Materials, Vol. 31, American Ceramic Societey, Westerville, 1993, pp. 71-80). A variant of this process is used by the Cabot Cooperation for the industrial production of a hydrophobic aerogel granulate. In this process, the lyogel, i.e. the gel filled with liquid, specifically solvent or water, is not produced from a silicon alkoxide but by gelation of an aqueous alkali silicate solution ("water-glass").

To enable drying under normal conditions, the method of Einarsrud et al. aims at mechanical stabilization of the gel network (cf. M.-A. Einarsrud, L. E. Farbrodt, S. Haereid, in: Hench, L. L., West, J. K. (eds.), Chemical Processing of Advanced Materials, Wiley, Chichester, 1992, pp. 355-361). For this purpose, the wet gel or lyogel is aged in a tetraalkoxysilane solution, such as TEOS. During aging, the tetraalkoxysilane condenses in the pores of the gel and fills them with silica. This makes the network more resistant, although some of the porosity is also lost (cf. T. Kornprobst, Aerogels and photocatalysts as an example of innovative building materials, dissertation TU Munich, 2013).

Another method of increasing the stability of silica gels was pursued by the EU-funded Hipin project, which was completed in March 2015. By pre-hydrolysis and pre-condensation of TEOS, the formal $SiO_2$ content is increased and the obtained gels are more stable. Aerogels with typical specific surface areas around 1000 $m^2/g$ can be obtained, but drying takes place supercritically (see S. Naik, High Performance Insulation based on Nanostructure Encapsulation of Air, http://www.hipin.eu (as of Sep. 23, 2015)).

DE 43 16 540 A discloses that aerogels can be obtained by drying inorganic and organic lyogels while retaining their structures by drying the lyogel by dielectric drying processes. In this context, dielectric drying processes are methods in which energy is supplied by electromagnetic waves, e.g. microwave drying, high-frequency drying or radiation. High-frequency drying with radio waves uses frequencies between 1 MHz and 1000 MHz, while microwave drying uses frequencies between 103 MHz and 106 MHz. With this type of drying, the selection of the gel used, the solvent and the specimen geometry must be precisely matched to the energy introduced so that a balance can be established between the capillary forces and the solvent evaporating inside the gel. However, the teaching given in DE 43 16 540 A from 1993 has not yet led to an industrial implementation of dielectric drying. In general, the properties of aerogels from subcritical drying methods are inferior to those from supercritical drying.

Aerogels are often produced industrially using the Cabot process. This is described, for example, in DE 19 648 798 A and DE 69 903 913 T2. For this purpose, diluted sodium silicate is reacted with hydrochloric acid at 60 to 80° C., and the gelation time, i.e. the time required for gel formation, can be set to a few minutes. The gel is then tempered at 80 to 100° C. for solidification and aging. The aging time is specified as 30 minutes. During the aging process or afterwards, the gel is washed until the wash water is free of electrolytes.

This is followed by silanization of the hydrogel to enable subcritical drying. Trimethylchlorosilane is used as the silanizing agent. Trimethylchlorosilane reacts largely with the water present in the hydrogel to form trimethylsilanol and condenses further to form hexamethyldisiloxane, which is incorporated into the pores and partially displaces the water.

It should be noted here that the silanizing agent used is added in very large quantities. For example, 100 g of hydrogel is reacted with 140 ml of trimethylchlorosilane. Only with this ratio of hydrogel to trimethylchlorosilane a partial conversion of the hydroxide groups on the silicon is achieved. Hexamethyldisiloxane and hydrochloric acid in the gas stream are used as alternative silanizing agents. This results in a partial back reaction of the hexamethyldisiloxane to the trimethylchlorosilane, which can then react with the hydroxyl groups of the silicon.

If one considers the molar ratios of HCl and hexamethyldisiloxane in the examples of the patents or patent applications mentioned, it is found that hexamethyldisiloxane is added in five to six times excess and only a small part of the hexamethyldisiloxane used can react to form the trimethylchlorosilane. This shows the importance of incorporating the hexamethyldisiloxane in the pores of the lyogel. Only in this way subcritical drying can be carried out. The drying itself is then carried out in a 200° C. nitrogen stream.

In the Aerogel Handbook (M. A. Aergerter et al., Aerogels Handbook, Advances in Sol-Gel Derived Materials and Technologies, 2011, p. 120), the importance of the molar ratio of silanizing agents to $SiO_2$ network is discussed in more detail. The hydrophobization step using a large amount of trimethylchlorosilane, which is toxic, flammable, and corrosive, represents the costliest process step in the preparation of aerogels by the Cabot process.

In drying processes, it is also frequently found that solvent exchange, in particular from polar solvents to less polar solvents, is important for successful drying.

Subrahmanyam et al. investigate the influence of different solvents on the structural changes during solvent exchange and supercritical drying of hydrogels based on a biopolymer (see Subrahmanyam, R., Gurikov, P., Dieringer, P., Sun, M., Smirnova, I., Gels, 2015, 1(2): On the Road to Biopolymer Aerogels—Dealing with the Solvent, pp. 291 to 313). During the study, significant differences were found between different solvents in terms of changes in pore geometry. The pore geometry is reduced if the solvent exchange is not carried out in one step, but in several partial steps. The influence of the solvent exchange on the pore geometry can be estimated using the solubility parameters according to Hansen and thus contribute to the selection of a suitable solvent.

From Kistler's studies on sodium silicate-based aerogels, on the other hand, it is known that solvent exchange from water to ethanol does not cause any significant change in pore geometry. This result is independent of whether the solvent exchange is carried out in one step or in several steps with increasing ethanol content. For the direct supercritical drying of $SiO_2$ gels from ethanol practiced there, a mass fraction of ethanol of 95 wt % is sufficient. In contrast, no value is known for supercritical drying using $CO_2$. The biopolymers studied by Subrahmanyam require a mass fraction of 93 wt. % for supercritical drying without significant reduction in specific surface area. For a mass fraction of 90%, 90 wt. % of the specific surface area is retained in the case of the biopolymers.

Solvent exchange from water to ethanol is studied by Gurikov et al. under the influence of compressed $CO_2$. The gels used are made of alginate and are prepared by $CO_2$-induced gelation. The samples comprise a diameter of 10 to 12 mm and are positioned in a preheated autoclave and surrounded with supercritical $CO_2$ (120 bar, 313 K). Mixtures of water and ethanol are then pumped into the autoclave in several stages and solvent exchange is carried out for 2.5 hours per stage, achieving an ethanol content of 30 wt % in the first stage, 60 wt. % in the second stage and 90 wt. % in the third stage. The gels are then re-flushed with 25 wt. % ethanol in $CO_2$ to completely extract the water from the pores before the gels are supercritically dried for 3 hours. The progress of the solvent exchange is analyzed using the composition calculated from the density of the solvent. For this purpose, 5 ml samples are taken from each autoclave. Under the given conditions, the time required for the respective stages of solvent exchange was reduced from 12 hours to 2.5 hours.

By using the supercritical carbon dioxide during the solvent exchange, the required drying time is additionally reduced from 6 hours to 3 hours.

After solvent exchange under the influence of compressed $CO_2$, the density of the gels is 0.021 $g/cm^3$, the specific surface area according to BET is 538 $m^2/g$, and the pore volume according to BJG is 5.96 $cm^3/g$. The obtained aerogels comprise similar properties as the reference samples prepared via solvent exchange at ambient conditions. A direct influence of solvent exchange under pressure on the properties of the prepared aerogels cannot be deduced from the available data, since different synthesis conditions are used for the different processes.

The same authors also perform solvent exchange in alginate-based biopolymers using compressed $CO_2$ at ambient temperature. An acceleration of mass transfer is measured for 50 bar and ambient temperature. The changes in solvent concentration are also quantified using the pseudo-second order kinetic model.

In addition to the previously described challenge of stabilizing the gel during the drying process, another problem in the production of aerogels, in particular silica aerogels, is the long process times. These make aerogel production more expensive and thus prevent the use of aerogels in a large number of applications for which aerogels would be suitable due to their physical property profile. The respective process times for the individual process steps in the production of silica aerogels from tetraethyl orthosilicate (TEOS) are as follows:

Hydrolysis and condensation times at least 8 hours (cf. A. A. Tweij Wesam, Temperature Influence on the Gelation Process of Tetraethylorthosilicate using Sol-Gel Techique, Iraqi Journal of Science 2009).

Gel aging times range from 6 to 72 hours (see Einarsrud, M.-A., Kirkedelen, M. B., Nilsen, E., Mortensen, K., Samseth, J., Structural Development of Silicagels aged in TEOS, Journal of Non-Cryst Solids 231, 1998, pp. 10-16).

Supercritical washing times/solvent exchange approx. 24 hours per washing cycle (cf. Kerstin Quarch, Product design on colloidal agglomerates and gels, gelation and fragmentation on inorganic silica, PhD thesis, KIT, 2010).

The supercritical drying times are strongly dependent on the preceding solvent exchange and the sample size.

In contrast, the following process times are observed for the preparation of silica aerogels based on sodium silicate solution by subcritical drying:

Gel formation times
  Addition of sulfuric acid and water to sodium silicate solution over 90 minutes, 30 minutes gel formation time at 8.6% $SiO_2$ content after addition of sulfuric acid (cf. Kerstin Quarch, Product design on colloidal agglomerates and gels, gelation and fragmentation on inorganic silica, dissertation, KIT, 2010),
  Gel formation times of 15 minutes when colloidal silica solutions are used at pH values between pH 5 and 6 (see Friederike Kleinert et al., Microstructure and Transmittance of Silica Gels for Application as transparent Heat Insulation Materials, Journal Sol-Gel Science Technol. 75, pp. 602-616, 2015),
  Gel formation times using sodium silicate solution (8% $SiO_2$ content) by ion exchanger of about 10 min.
Aging times of gels
  Aging times of gels based on sodium silicate are about 50 hours at 50° C. (cf. Schwertfeger, F., Hydrophobic Water-glass based Aerogels without solvent Exchange or supercritical Drying).
  Aging times of silica gels are approx. 1.5 hours (cf. Schwertfeger, F., Hydrophobic Waterglass based Aerogels without solvent Exchange or supercritical Drying)

Typical process times for the production of aerogels from sodium silicate with subcritical drying, in combination with solvent exchange and hydrophobization are typically:

Gel formation and aging times 1 second to 2 hours.
Wash times to get the gel sodium-free are not known.
Solvent exchange using acetone takes about 2 hours.
Duration of silanization, i.e. hydrophobization, using hexamethyldisiloxane at room temperature: 5 hours
Subcritical drying
  17 hours at 150° C. or
  1 hour in a 200° C. nitrogen/hexamethyldisilazane stream.

Thus, even in the most favorable case, the process duration is at least 8 hours, and this does not consider washing times to obtain the gel free of sodium.

A significant improvement is brought by the one-pot method developed by the Swiss Federal Laboratories for Materials and Testing (EMPA), whose individual steps require the following time:

The time for gel formation and aging is about 2 hours due to the use of hexamethyldisilazane (HDMSO), ammonia, water, ethanol and TEOS.

Hydrophobization of the wet gel is performed using a mixture of HCl and HDMSO over a period of 1 hour.

The supercritical drying time is about 1 hour.

The total process times are thus between 4 and 6 hours.

However, even these process times still constitute major challenges for large-scale industrial production, with large surpluses of hydrophobing agents also having to be used, particularly in the case of hydrophobing, in order to obtain the necessary hydrophobing for solvent exchange.

In the context of aerogel production, it is also known that the gelation of silica aerogels can be induced by carbon dioxide. An influence of gelation of silica-based aerogels is described by Smirnova (Journal of Sol-Gel Science 28, pp. 175-184, 2003) and by Xiaodong Wu (Journal Ceramics International 44, pp. 821-829, 2018), respectively. As a basis for the study, Smirnova uses tetramethyl orthosilicate-based (TMOS-based) systems with a molar composition of TMOS:MeOH:$H_2O$ of 1:2.4:4, which are regarded in the pressure range of 5 to 50 bar. Here, the gelation time can be reduced from 230 minutes to slightly less than 50 minutes. In the publication by Xiaodong Wu, gaseous $CO_2$ is passed through a water glass solution with a pH of 13, so that gelation started by lowering the pH to 9 in about 35 minutes.

A problem common to all of the aforementioned processes for producing aerogel is that usually undefined particles without a regular external shape are obtained, which are difficult to use in loose fill or even for incorporation into insulating plaster systems. These irregular particles are mechanically much less resilient and form less dense sphere packings than would be expected for regular, especially spherical, particles. For this reason, the effectiveness of aerogel in practice often falls short of the calculated values.

Thus, the prior art still lacks a system to reproducibly produce aerogels with significantly reduced process times, allowing continuous or quasi-continuous production at reduced costs. Furthermore, it is equally not possible to produce aerogels with a defined geometric structure on an industrial scale and in a reproducible manner. For many applications, spherical, i.e. spherical, aerogel particles in particular are preferred, as these are likely to have a significantly higher mechanical load-bearing capacity.

Similarly, it is not yet possible to produce aerogel particles with preselected particle sizes in a targeted manner.

It is therefore an object of the present invention to eliminate, or at least mitigate, the disadvantages associated with the state of the art described above.

In particular, one object of the present invention is to provide a method for producing aerogel particles which can be carried out with significantly shorter process times and preferably continuously or quasi-continuously.

A further object of the present invention is to being able to produce aerogels with defined properties, in particular also defined external shape and defined particle size, in a targeted manner.

In addition, a further object of the present invention is to provide an aerogel which is mechanically loadable and is suitable in particular for use in insulating materials.

According to the present invention, the object set out above is solved by a method according to claim 1; further, advantageous embodiments and configurations of the method according to the present invention are subject of the respective dependent claims.

It goes without saying that special features, characteristics, configurations and embodiments as well as advantages or the like which are set forth below only with respect to one aspect of the invention—for the purpose of avoiding unnecessary repetition—naturally apply accordingly with respect to the other aspects of the invention, without the need for express mention.

In addition, it applies that all values or parameters or the like mentioned in the following can in principle be determined or specified with standardized or explicitly stated determination methods or specification methods familiar to the person skilled in the art.

Furthermore, it goes without saying that all weight- or quantity-related percentages are selected by the person skilled in the art in such a way that the total results in 100%; however, this goes without saying.

With this proviso stated, the present invention will be described in more detail below.

Thus, the subject-matter of the present invention—according to a first aspect of the present invention—is a method for producing a silica aerogel by means of a sol-gel process, wherein first a lyogel is produced from a sol and subsequently the lyogel is converted into an aerogel, wherein the production of the lyogel is carried out at least partially at a pressure of more than 30 bar.

For, as the applicant has surprisingly found, by applying pressures of more than 30 bar during the production of a lyogel from a sol, in particular a precursor sol, i.e. a solution or dispersion of a precursor, a dimensionally stable gel can be produced almost instantaneously. In this way, for example by dripping or spraying a sol into an autoclave, lyogel particles and ultimately also aerogel particles can be obtained which correspond in their external shape to the drops introduced into the autoclave. This means that in the method according to the present invention, almost spherical or cylindrical aerogels, in particular silica aerogels, are accessible, which so far have not been known in the prior art.

Furthermore, within the scope of the present invention, the process duration for producing silica aerogels from gel formation to drying completion—if all process steps are carried out at elevated pressure—can be reduced to times of 1 to 2 hours, in particular less than 1.5 hours. This is a considerable time saving compared to the prior art and thus enables continuous or quasi-continuous production of aerogels. In addition to process times, the method according to the invention can also significantly reduce costs due to faster production, thus opening up further areas of application for aerogels in an industrial environment.

Since spherical or cylindrical aerogel particles are accessible with the methods according to the invention, they are excellently suited as thermal insulation materials, in particular in loose filling, but also for incorporation into insulating plaster systems, due to their excellent mechanical properties or resistance as well as the possibility of producing dense spherical packings.

Due to the almost instantaneous, i.e. immediate, gel formation, it is also possible to selectively adjust both the particle size and the particle size distribution of the obtained lyogel particles and thus also of the aerogel particles.

In the context of the present invention, a sol-gel process is understood to be a method in which non-metallic inorganic or organic materials or inorganic-organic hybrid materials are obtained from colloidal dispersions, the so-called sols. In a sol-gel method, particles in the nanometer range are usually obtained from a colloidal dispersion, the sol, by aggregation, which subsequently form a gel by further condensation and aggregation, i.e., a three-dimensional network whose pores are filled with a fluid, the fluid being either a liquid or a gas.

In the context of the present invention, a gel is a dimensionally stable dispersed system rich in liquids and/or in gases, consisting of at least two components, which are at least a solid, colloidally divided substance with long or widely branched particles, such as gelatin, silicic acid, montmorillonite, bentonite, polysaccharides, pectins and others, and a fluid, in particular a gas or a liquid, as dispersant. In this case, the solid substance is coherent, i.e. it forms a spatial network in the dispersant, with the particles adhering to one another by secondary or principal valences at various points, the so-called adhesion points. If the spaces between the particles are filled with a liquid, a lyogel is present. If the dispersant is air, the gel is called an aerogel. For further details on the term gel, please refer to the entry on the keyword "gels" in ROEMPP Chemie Lexikon, 9th expanded and newly revised edition, Volume 2, 1999, p. 1511.

A lyogel is a gel, i.e. a three-dimensional network whose pores are filled with a liquid. Special cases of the lyogel are the hydrogel, in which the liquid is water, or the alcogel, in which the liquid is an alcohol, usually ethanol. Lyogels which contain organic solvents are also referred to as organogels.

In the context of the present invention, a sol means a solution or a finely divided dispersion, i.e. a colloidal dispersion.

In the context of the present invention, a solution is understood to be a single-phase mixture in which one substance—the solute—is homogeneously distributed in a second substance—the solvent. In the context of the present invention, a dispersion is to be understood as a two-phase mixture in which a first phase with the dispersed substance, the so-called discontinuous phase, is finely distributed, in particular homogeneously distributed, in a second phase, the dispersant or continuous phase. The transition from solutions to dispersion is fluid and cannot be strictly defined from one another; for example, colloidal solutions cannot be clearly assigned to either solutions or dispersions. Even in the case of "solutions" of high-polymer macromolecules, it is not possible to determine unambiguously whether a solution or dispersion is present. In the context of the present invention, therefore, a sol is preferably understood to mean a solution or a finely divided, i.e. colloidal, dispersion.

According to a preferred embodiment of the present invention, the production of the lyogel is carried out entirely at an elevated pressure. In this context, it has proven particularly useful if the production of the lyogel is carried out in an autoclave, for example by introducing the sol into an autoclave.

Preferably, the method according to the invention, in particular the lyogel formation, is carried out in a process medium under pressure, in particular a compressed gas or a supercritical substance or mixture of substances. The process medium used is in particular carbon dioxide and/or inert gases, in particular nitrogen and/or argon, optionally in combination with other gases or substances. It has been proven advantageous, in particular if carbon dioxide and/or nitrogen, if necessary in combination with further gases or substances, are used. Usually, carbon dioxide, mixtures of carbon dioxide and nitrogen or mixtures of nitrogen and ammonia are used as process media. In the context of the present invention, a substance means in particular a chemical substance, i.e., a chemical compound or element with specific physical or chemical properties.

In the context of the present invention, particularly good results are obtained if the production of the lyogel is carried out in compressed carbon dioxide, in particular supercritical carbon dioxide. The use of supercritical carbon dioxide has in particular the advantage that acidification of the sol to initiate gel formation in the production of silica aerogels can be dispensed with and also that no other electrolytes need to be added to the sol, which would subsequently have to be removed again. Initiation of gel formation by shifting the pH can also be achieved by using mixtures of nitrogen or argon with ammonia, in which case the sol preferably comprises a pH in the acidic range.

As far as the pressure is concerned at which the method according to the invention is carried out, this can naturally vary over a wide range. However, it has proven to be advantageous if the pressure is more than 40 bar, in particular more than 50 bar, preferably more than 60 bar, more preferably more than 70 bar, particularly preferably more than 74 bar.

Similarly, it may be provided in the context of the present invention that the pressure is set between 30 and 300 bar, in particular in the range of from 40 to 250 bar, preferably in the range of from 50 to 200 bar, more preferably in the range of from 60 to 180 bar, particularly preferably in the range of from 70 to 160 bar, especially preferably in the range of from 74 to 150 bar Particularly good results are also obtained if the production of the lyogel is carried out at elevated temperature. In this context, it has proven to be advantageous if the production of the lyogel is carried out at temperatures above 50° C., preferably 70° C., more preferably 80° C.

Similarly, it may be envisaged that the production of the lyogel is carried out at temperatures in the range of from 50 to 200° C., in particular 60 to 180° C., preferably 70 to 160° C., more preferably 80 to 140° C.

At the pressures and temperatures mentioned above, a particularly rapid gel formation can be achieved, whereby, for example, almost spherical lyogels can be obtained which are dimensionally stable and retain their shape in the further method. In addition, it has been proven to be advantageous if the conversion of the lyogel into an aerogel is carried out at a pressure of more than 50 bar. In the context of the present invention, the conversion of the lyogel into an aerogel preferably means all measures and method steps which are necessary to remove the liquid solvent or dispersant from the lyogel.

According to a preferred embodiment of the present invention, the production of the lyogel and the conversion of the lyogel into an aerogel is carried out continuously or quasi-continuously.

With the method according to the invention, the process times, in particular the times of the individual method steps, can be shortened in such a way that continuous or at least quasi-continuous producing of aerogels, in particular silica aerogels, is possible. The preparation can be carried out either as a one-pot method, i.e. in a reaction vessel, in particular an autoclave, or in successive apparatuses, in particular several autoclaves.

In the context of the present invention, it is usually provided that the sol is a solution or dispersion of a precursor.

In the context of the present invention, a precursor is understood to be a precursor substance from which the desired target compound, in particular an $SiO_2$ network, is formed by chemical reaction, in particular by hydrolysis or solvolysis and subsequent condensation.

In principle, all compounds capable of forming a gel from precursors can be used as precursors in the context of the present invention. In particular, gel formation can take place at acidic pH values, a neutral pH value or a basic pH value. Particularly preferably in this context, gel formation takes place in an acidic pH range, since here, especially when supercritical $CO_2$ is used as the process medium, the gel formation times are extremely shortened and the use of electrolytes for gel formation can be dispensed with. Alternatively, gel formation can also take place at basic pH values, for example by using mixtures of nitrogen and ammonia as the process medium.

Particularly good results are obtained when the precursor is selected from silicic acids, in particular colloidal silica, silica sols, silanes, preferably tetraalkoxysilanes, siloxanes and mixtures thereof. On hydrolysis, the aforementioned compounds form an optionally organically modified silica network, which is eminently suitable for producing silica aerogels.

Particularly good results are obtained in this context if the precursor is selected from silicic acids, in particular colloidal silica, silica sols, and tetraalkoxysilanes, preferably tetraethoxysilanes and/or tetramethoxysilanes. Particularly preferably, the precursor is a silicic acid.

In the context of the present invention, it is usually provided that the sol comprises at least one solvent or dispersant.

In this context, it has been well proven if the solvent or dispersant is selected from alcohols, in particular methanol, ethanol, isopropanol, ethers, dimethyl sulfoxide (DMSO), N,N-dimethyl formamide (DMF), acetone, propylene carbonate, ethyl acetate, water and mixtures thereof.

Particularly good results are obtained in this context if the solvent or dispersant consists of alcohols, in particular methanol, ethanol, isopropanol, water and mixtures thereof. In particular, mixtures of organic solvents and water, in particular ethanol and water, are especially preferred in the context of the present invention, since, on the one hand, rapid hydrolysis and condensation of the precursor compound occurs due to the water and, on the other hand, a proportion of organic solvents enhances the removal of the solvent or dispersant from the pores of the lyogel.

The use of organic solvents such as ethanol, acetone, dimethyl sulfoxide for gel synthesis offers the possibility to also use hydrophobing agents such as trimethylsilanol, methyltriethoxysilane, diphenylsilanediol, hexamethyldisilazane etc. directly during the gelation process.

In particular for producing silica aerogels or lyogels, precursor solutions preferably based on silica sols, colloidal silicas and silicic acid tetraethylesters are first prepared and introduced. In the case of silica sols and silicic acid, the precursors are pre-silicified water glass (polysilicic acids) with varying degrees of silification and reduced alkali content. The monosilicic acids, which are generally produced by means of ion exchangers, are predominantly present as di- and tri-silicic acids due to condensation processes.

The silica sols, on the other hand, comprise a significantly higher degree of silicification and usually have a primary particle size of between 5 and 40 mm. Compared to the silicic acid tetraethylesters (TMOS, TEOS) and potassium silicates often used in aerogel production, the use of silica sols and silicic acids offers the possibility of targeted control of the gelation and the subsequent aging process of the hydrogels. In the silica sols and silicas, the silica nanoparticles are generally present in solutions stabilized via ionic charges.

One way of obtaining polysilicic acids with a low water content and a higher proportion of organic solvents is to use alcoholic silicic acid tetraethylesters, but these must be pre-hydrolyzed first to ensure sufficiently rapid polycondensation of the monosilicic acid that forms. To increase the amount of monosilicic acid in the precursor solution, aqueous silica solutions can be added after the silicic acid tetraethyl esters have been hydrolyzed and gel formation can then be initiated to produce an organogel with a low water content.

According to a particular and equally preferred embodiment of the present invention, the solvent or dispersant is water.

Now, as to the times in which the lyogel is formed, these are extremely short, as previously described. In the context of the present invention, it is usually envisaged that the production of the lyogel under pressure takes place within 0.1 to 60 seconds, in particular 0.2 to 30 seconds, preferably 0.2 to 10 seconds, more preferably 0.3 to 5 seconds, particularly preferably 0.3 to 3 seconds. Thus, within the scope of the present invention, as previously stated, an almost instantaneous, i.e. immediate gel formation is possible.

In the context of the present invention, it has furthermore been well proven if the sol comprises a pH greater than or equal to 7, in particular greater than 7, preferably greater than 8, more preferably greater than 8.5.

The use of a sol with a pH in the basic range generally prevents premature gel formation and, especially when supercritical $CO_2$ is used as the process medium, in particular to generate high pressure, rapid gel formation can occur, since carbon dioxide reacts as an acid in the presence of water and the sol is thus acidified at preferably elevated temperature and pressure, i.e. under strongly reactively accelerating circumstances. This results in instantaneous gel formation, which allows regular spherical or cylindrical lyogel particles to be synthesized.

In the context of the present invention, it may further be provided that the sol comprises a pH in the range of from 7 to 14, in particular from 8 to 11, preferably from 8.5 to 11.

Especially for producing silica aerogels or lyogels, in addition to gel formation by carbon dioxide as process medium, further possibilities of formation can be used alternatively or additionally.

In the case of silicic acids, gel formation can most easily be initiated by a pH shift into the neutral pH range. In this case, the gel formation times can be adjusted in the range of seconds.

Preferably, in the context of the present invention, aqueous dilute solutions or dispersions based on silica sols, silicic acids or tetraalkoxysilane are at least partially dripped into an autoclave with compressed carbon dioxide for producing silica aerogels or lyogels. Here, the compressed carbon dioxide can be used for targeted gelation and continuous gel production of the precursor solution by a pH shift. Surprisingly, gelation occurs immediately upon entry of the sol into the autoclave when the pH is set greater than 7, preferably between 8.5 and 11. Gel formation proceeds so rapidly that dimensionally stable spherical or cylindrical particles are obtained. The aging times of the hydro- or organogels prepared in this way are in particular in the range of about 30 minutes at room temperature. By increasing the temperature during the dripping phase to 100° C., the aging time can be reduced to a few minutes.

Alternatively, precursor solutions or sols, in particular silicic acid solutions, with pH values in the acidic range can be used and brought into contact with a basic process medium, for example a mixture of nitrogen and ammonia. This likewise induces gel formation by shifting the pH.

In addition, the sol usually requires a certain solids content in order for a dimensionally stable gel to form. The solids content of the sol is to be understood as the portion of the sol which remains after removal of all liquid components.

It has been well proven in the context of the present invention if the sol comprises a solids content of at least 2 wt %, in particular 2.5 wt. %, preferably 3 wt %, more preferably 4 wt. %, especially 5 wt %, based on the sol.

According to a preferred embodiment of the present invention, it is provided that the sol comprises a solids content in the range from 2 to 30 wt %, in particular 2.5 to 20 wt %, preferably 3 to 15 wt %, more preferably 4 to 10 wt %, particularly preferably 5 to 9 wt %, based on the sol.

With solids contents in the above-mentioned range, dimensionally stable lyogels can be obtained particularly quickly, which also comprise the desired high pore content.

In the context of the present invention, it may be provided that the sol comprises a hydrophobing agent, in particular a silanizing agent. The use of a hydrophobing agent, in particular a silanizing agent, in the sol leads in particular to an incorporation of hydrophobic groups into the framework of the lyogel. This in turn causes a more elastic gel structure, which is significantly more resilient than, for example, a pure $SiO_2$ structure during any solvent exchange that may be carried out or even during drying.

In the context of the present invention, it is preferred if the hydrophobing agent is selected from organosilanes, in particular monoorganosilanes, diorganosilanes, triorganosilanes, silazanes, silanols, in particular monoorganosilanols, diorganosilanols, and mixtures thereof. In the context of the present invention, organosilanes or organosilanols are understood to mean silanes or silanols with organic groups, in particular hydrophobic organic groups, such as alkyl, alkenyl or aryl.

If a silane is used as a hydrophobing agent in the context of the present invention, its chemical nature can likewise vary over a wide range. However, particularly good results are obtained when a silane of the general formula I $$R^1_n SiR^2_{4-n} \quad (I)$$

with
n=1 to 3, in particular 1 or 2, preferably 1;
R1=$C_1$- to $C_{30}$-alkyl and/or $C_6$- to $C_{30}$-aryl,
  in particular $C_2$-$C_{20}$-alkyl and/or $C_6$-$C_{20}$-aryl,
  preferably $C_3$- to $C_{20}$-alkyl and/or $C_6$- to $C_{20}$-aryl,
  more preferably $C_4$-$C_{15}$-alkyl and/or $C_6$-$C_{15}$-aryl,
  particularly preferably $C_5$-$C_{12}$-alkyl and/or $C_6$-$C_{12}$-aryl,
  very preferably $C_5$-$C_{12}$-alkyl;

R2=halide, in particular chloride, bromide and/or iodide,
OX where X=hydrogen, alkyl, aryl, polyether
and/or carboxylic acid derivative,
in particular alkyl, preferably $C_1$- to $C_8$-alkyl,
preferably $C_2$- to $C_4$-alkyl;
is used.

Particularly good results are obtained in the context of the present invention if the hydrophobing agent is selected from organochlorosilanes, in particular monoorganochlorosilanes, diorganochlorosilanes, triorganochlorosilanes, methoxyorganosilanes, in particular trimethoxyorganosilanes, dimethoxydiorganosilanes, methoxytriorganosilanes, ethoxyorganosilanes, in particular triethoxyorganosilanes, diethoxydiorganosilanes, ethoxytriorganosilanes, hexamethylenedisilazane, trimethylsilanol, diphenylsilanediol, phenyltriethoxysilane, trimethylisopropenoxysilane and mixtures thereof. By using hydrophobing agents, in particular silanizing agents, at an early stage before gel formation, the network structure that forms can be influenced and the pore sizes that form can be controlled. In addition, elasticization of the gel network can be achieved by incorporating mono- and difunctional silanizing agents. Both can be used to accelerate a subsequent solvent exchange of the produced hydrogel.

In the context of the present invention, it is preferred, if the sol is introduced, in particular is dripped and/or sprayed, into a pressurized apparatus in the form of droplets.

By the introduction in droplet form, for example via dripping or spraying into a pressurized apparatus, in particular an autoclave, it is possible to synthesize aerogels with a nearly circular cross-section. Depending on the adjustment of the dripping speed or the spray conditions of the sol into the apparatus, nearly spherical and/or cylindrical particles can be obtained. The nozzle therefore can be designed, for example, in the form of a slot nozzle or a capillary and the sol can be introduced into the apparatus by a pump, in particular a high-pressure pump.

The introduction of the sol in the form of droplets into a pressurized apparatus thus makes it possible to obtain almost spherical lyogel particles which also remain dimensionally stable in the further method. This makes spherical aerogels accessible, which comprise improved mechanical properties compared to the state of the art and which can form denser spherical packings, thus being more suitable as thermal insulation materials, both in loose filling and, for example, for incorporation into insulating plaster systems.

According to a particular embodiment of the present invention, it is provided that the sol is pre-gelled before application of a pressure of more than 30 bar, in particular before introduction into the pressurized apparatus. Pre-gelation is understood to mean the production of larger network structures and aggregates, although no continuous spatial network is yet obtained. The pre-gelled sol is also still flowable and can, for example, be dripped or sprayed into an apparatus.

As described previously, the lyogel is preferably in the form of particles with a circular cross-section, in particular in the form of spherical or cylindrical particles.

A method for producing a lyogel and subsequently also aerogel particles with a circular cross-section is not yet known, especially for silica aerogels.

In the context of the present invention, in particular by adjusting the condition under which the sol is introduced into the pressurized apparatus, it is possible to selectively influence and adjust both the particle size and the particle size distribution.

As previously stated, multiple reactor designs are possible to achieve gelation of the precursor sol.

Preferably, the precursor solution is metered into a high-pressure vessel filled with carbon dioxide during production. Ideally, the injection is carried out in such a way that a droplet chain or gel strand is formed. The precursor solution is liquid or partially gelled when it enters the high-pressure vessel and preferably gels completely immediately afterwards due to contact with the carbon dioxide, with production of carbonic acid and a corresponding change in pH. The solvent contained in the resulting gel, such as water or ethanol, is then dissolved in the compressed carbon dioxide, in particular during storage of the gel, so that a dry particle, the aerogel, can be obtained.

In general, it is possible to selectively destabilize the silica sols and silicic acids, in particular in a two-step process, e.g. by pH shift or electrolyte addition, to bring the precursor solutions to gel formation. Electrolyte additives, pH shifts by acids or bases and denaturing solvents such as ethanol and acetone can be used for hydrogel formation and thus accelerate the hydrolysis and condensation rate of the silica sol or polysilicic acid. Here, the polycondensation ability of the silicic acids represents the rate-determining step in the production of a dimensionally stable, three-dimensional network. It has been shown that the use of ethanol and electrolytes enables the targeted gelation of the silicic acid or silica sols. Organogels with 66 vol. % ethanol content can be synthesized. These are characterized by a high hydrolysis and condensation rate as well as the production of a dimensionally stable organogel network.

Studies on the dropability of precursor solutions for producing silica aerogels show that gelation can be initiated by contacting a precursor solution with compressed carbon dioxide at the inlet of a high-pressure vessel filled with carbon dioxide. The precursor sol consisting of a silica sol, silica solution and/or silica tetraethylester is present in liquid or partially gelled form at the inlet to the high-pressure vessel and gels completely immediately afterwards. The droplet size in this case can be controlled in particular by the selected nozzle orifice and the gelation rate and, when a 2 mm nozzle is used, is typically in the range between 0.5 and 5 mm. By selecting a smaller nozzle, the gel particle size can be further reduced. The forming particles preferably comprise a spherical shape and retain the shape during the subsequent process steps.

For pre-gelation or partial gelation of the precursor sols, in particular in a two-substance feed, acids or bases can be added to the silicic acid, which is stabilized respectively in a basic or acidic form, and the gelation times can be adjusted via the resulting pH value. The more preferred possibility, however, is a pH shift due to the drying gas or process medium used. In the case of compressed $CO_2$, a pH decrease can occur through the formation of carbonic acids, as previously stated, while a pH increase can occur, for example, through the use of inert gases, in particular nitrogen and/or argon, in combination with ammonia.

The gelation of silica sols can be carried out in an analogous manner as described above for the silicic acids. In addition, the silica sols can be gelled by using electrolyte additives, for example polyvalent metal salts and denaturing solvents such as ethanol or acetone.

Silicic acid tetraethylesters such as tetraethyl orthosilicate (TEOS) and tetramethyl orthosilicate (TMOS) offer—as explained above—the possibility of producing organogels with low water content, which significantly accelerates the subsequent solvent exchange. To accelerate the gelation rates of these precursor sols, pre-hydrolysis of the metal alcoholates can be performed, which can be carried out in both acidic and basic pH ranges, favoring the formation of three-dimensional networks in the acidic one.

Mineral acids such as hydrochloric acid can be used as catalysts for the pre-condensation. In particular, the pre-condensation can be accelerated by using catalysts such as organic acids, in particular acetic acid, inorganic acids, such as hydrochloric acid, or Lewis acids, such as titanium tetrabutanolate. Pre-condensation with acetic acid at pH values of 3.5 to 4.5 and stoichiometric content of water to tetraethyl orthosilicate of 2.5 to 3.5 produces precursor sols within a few hours, which can be gelled by pH shifts and addition of water.

In addition, it is possible to shift the pH of these pre-condensed tetraethyl orthosilicate solutions or sols into the basic range and thus trigger $CO_2$-induced gelation, analogous to the gelation of silicic acid. In addition, silica sols are compatible in particular with silicic acids, so that these solutions can be used mixed, which significantly reduces gelation times.

According to a preferred embodiment of the present invention, the present invention relates to a method as described above, wherein
(a) in a first method step a sol, in particular a solution or dispersion of a precursor, is provided, and
(b) in a second method step following the first method step (a), the sol is introduced, in particular is dripped or sprayed, into an apparatus subjected to a pressure of more than 30 bar, wherein a particulate lyogel is obtained.

To this particular embodiment of the method according to the present invention, all advantages and particularities as well as features mentioned before can be equally applied.

In the context of the present invention, it may further be provided that after production of the lyogel, the lyogel is aged. If the lyogel is allowed to age, it is preferred if the lyogel is aged for a period of 1 minute to 1 hour, in particular 2 to 50 minutes, preferably 3 to 40 minutes, more preferably 5 to 35 minutes, particularly preferably 10 to 20 minutes. Aging the lyogel in particular solidifies the gel structures so that they are significantly more stable and resistant in the subsequent drying process.

More preferably, the aging of the lyogel is carried out at the temperature at which the production of the lyogel takes place. In this context, it is preferred if the aging of the lyogel is carried out in a temperature range of from 50 to 130° C., in particular from 60 to 120° C., preferably from 80 to 110° C.

The pressures at which the aging process is carried out can vary over a wide range. Particularly preferably, however, in the context of the present invention, the aging of the lyogel is carried out at pressures similar to those used for the production of the lyogel. Due to the high pressure, a much faster gel formation and aging of the lyogel is achieved, in particular in a $CO_2$ atmosphere.

In the context of the present invention, it is thus possible to reduce the aging time of a lyogel, in particular a hydrogel, which usually takes at least 2 hours, to less than 15 minutes.

In the context of the present invention, it may be provided that after the production of the lyogel, in particular following method step (b), a solvent exchange is performed, in particular in a third method step (c). A solvent exchange may be necessary in particular to facilitate subsequent drying of the lyogel to an aerogel. Water is difficult to remove from the usually hydrophilic network, in particular $SiO_2$ network, of the lyogel in the drying process by adding thermal energy. This is true even if the lyogel has been hydrophobized.

In particular, in order to reduce the water content of the previously produced lyogels, in particular hydrogels or organogels, prior to the actual drying step, it may be necessary to subject the gels to a solvent exchange, for example by covering the particles with an organic solvent.

The produced particles, in particular hydrogel particles, which preferably have a circular cross-section, have a water content that usually makes drying more difficult.

It has been shown that water reduction of the starting silica solution significantly accelerates the drying rates depending on the organic solvent added.

In this context, it is more preferably the case that, in order to carry out the solvent exchange, the lyogel is brought into contact with a liquid or gaseous organic solvent.

The organic solvent can be introduced into the reaction chamber in gaseous form and then displaces water or other organic solvents stored in the pores of the lyogel. Similarly, it is also possible for the lyogel to be brought into contact with the liquid solvent, in particular to be dispersed in it or to be covered with it, and thus to achieve extensive solvent exchange, for example by repeated covering with solvents and removal of the mixture of water and/or organic solvents. Preferably, the solvent with which solvent exchange is carried out is soluble in a drying gas, in particular carbon dioxide. In this way, it is possible to carry out supercritical drying with carbon dioxide much faster and more gently.

In the context of the present invention, it is also preferred if the solvent exchange in particular reduces the water content of the lyogel to a value of less than 30 wt. %, in particular less than 20 wt %, preferably less than 15 wt. %, more preferably less than 10 wt %, based on the lyogel. By lowering the proportion of in particular water in the lyogel, a target-oriented and gentle drying with carbon dioxide in the supercritical range becomes possible.

In the context of the present invention, it is preferably provided that the solvent exchange, in particular the bringing into contact of the lyogel with the solvent, is performed at elevated pressure. A solvent exchange at an elevated pressure significantly accelerates the solvent exchange, and in particular only small amounts of organic solvents, in particular gaseous organic solvents, can be added to a compressed and pressurized gas phase, which are then nevertheless sufficient to displace water or other solvents from the pores of the lyogel. Preferably, in the context of the present invention, either liquid solvent or a mixture of water and organic solvent is removed from the apparatus during solvent exchange, or the gaseous phase contaminated with water is at least partially removed from the reactor and new solvent is introduced into the reactor in the gaseous state in order to obtain solvent exchange that is as complete as possible.

In the context of the present invention, particularly good results are obtained if the solvent exchange, in particular the bringing into contact of the lyogel with the solvent, is carried out at pressures of more than 30 bar, in particular more than 50 bar, preferably more than 70 bar, more preferably more than 100 bar, particularly preferably more than 120 bar.

Similarly, it is possible that the solvent exchange, in particular the bringing the lyogel into contact with the solvent, is performed at pressures in the range of from 30 to 300 bar, in particular from 50 to 250 bar, preferably from 70 to 200 bar, more preferably from 100 to 180 bar, particularly preferably from 120 to 170 bar.

With regard to the temperature range at which the solvent exchange is carried out, it has been well proven that the solvent exchange is performed at elevated temperature. Particularly good results are obtained in this context if the solvent exchange, in particular the bringing the lyogel into contact with the solvent, is performed at temperatures above 50° C., in particular above 70° C., preferably above 90° C., more preferably above 100° C., particularly preferably above 110° C. A high temperature, especially in conjunction with a high pressure, ensures that the solvent is exchanged as quickly and completely as possible.

In this context, it can equally be provided that the solvent exchange, in particular the bringing into contact of the lyogel with the solvent, is performed at temperatures in the range of from 50 to 180° C., in particular from 70 to 160° C., preferably from 90 to 150° C., more preferably from 100 to 140° C., particularly preferably from 110 to 130° C.

Now, as far as the organic solvent is concerned, it has been well proven if the solvent is selected from the group of hydrophilic organic solvents, hydrophobic organic solvents and mixtures thereof. Particularly preferably in the context of the present invention, the organic solvent is soluble in carbon dioxide.

In the context of the present invention, an organic solvent is to be understood as a solvent or dispersant which comprises organic groups.

Now, as far as the organic solvent is concerned, it has been well proven when the organic solvent is selected from the group of group of alcohols, ethers, dimethyl sulfoxide, N,N-dimethyl formamide, $C_5$- to $C_8$-alkanes and mixtures thereof. Particularly good results are obtained in the context of the present invention when the organic solvent is selected from methanol, ethanol, isopropanol, dimethyl sulfoxide, n-pentane, n-hexane, n-heptane, cyclohexane and mixtures thereof. The above-mentioned solvents not only allow solvent exchange and easy subsequent drying. The solvents are also ideally suited for contacting the lyogel with modifying reagents.

In the context of the present invention, it may be provided in particular that the organic solvent is brought into contact with the lyogel together with a hydrophobing agent, in particular a silanizing agent Within the scope of the present invention, it is thus possible to carry out hydrophobing, in particular silanization, of the lyogel even during solvent exchange, in order to subsequently enable simple drying and conversion of the hydrogel into an aerogel. In order to achieve particularly effective hydrophobing, in particular silanization, it is advantageous if the water content of the lyogel is at least 50 wt. %, in particular at least 60 wt. %, preferably at least 70 wt %, when the organic solvent and the hydrophobing agent are first brought into contact with the lyogel. In this way, rapid hydrolysis and reaction of the reactive groups of the hydrophobing agent, in particular of the silanizing agent, is given.

As far as the chemical nature of the hydrophobing agent is concerned, it has been well proven that the hydrophobing agent is selected from organosilanes, in particular monoorganosilanes, diorganosilanes, triorganosilanes, silazanes, silanols, in particular monoorganosilanols, diorganosilanols and mixtures thereof.

If, in the context of the present invention, a silane is used as a hydrophobic agent, its chemical nature may vary within wide ranges. However, particularly good results are obtained if a silane of the general formula I

(I)

with
n=1 to 3, in particular 1 or 2, preferably 1;
$R^1$=$C_1$- to $C_{30}$-alkyl and/or $C_6$- to $C_{30}$-aryl,
  in particular $C_2$- to $C_{20}$-alkyl and/or $C_6$- to $C_{20}$-aryl,
  preferably $C_3$- to $C_{20}$-alkyl and/or $C_6$- to $C_{20}$-aryl,
  more preferably $C_4$-$C_{15}$-alkyl and/or $C_6$-$C_{15}$-aryl,
  particularly preferably $C_5$-$C_{12}$-alkyl and/or $C_6$-$C_{12}$-aryl,
  most preferably $C_5$- to $C_{12}$-alkyl;
$R^2$=halide, in particular chloride, bromide and/or iodide,
  OX where X=hydrogen, alkyl, aryl, polyether and/or carboxylic acid derivative,
    in particular alkyl, preferably $C_1$- to $C_8$-alkyl,
    more preferably $C_2$- to $C_4$-alkyl;
is used.

Particularly good results are obtained in this context if the hydrophobing agent is selected from organochlorosilanes, in particular monoorganochlorosilanes, diorganochlorosilanes, triorganochlorosilanes, methoxyorganosilanes, in particular trimethoxyorganosilanes, dimethoxydiorganosilanes, methoxytriorganosilanes, ethoxyorganosilanes, in particular triethoxyorganosilanes, diethoxydiorganosilanes, ethoxytriorganosilanes, hexamethyldenisilazane, trimethylsilanol, diphenylsilanediol, phenyltriethoxysilane, trimethylisopropenoxysilane and mixtures thereof.

Thus, the hydrophobing agents preferably used during solvent exchange correspond to the hydrophobing agents which are also used during hydrophobing or silanization of the sol. In the context of the present invention, it is more preferably the case that a hydrophobing agent, in particular a silanizing agent, is added to the precursor sol as well as that further hydrophobing is carried out after lyogel formation.

Hydrophobing of the pores of the lyogel is achieved by hydrophobing after production of the lyogel, in particular as part of a solvent exchange or as an independent method step. During solvent exchange, hydrophobing of the pores, in particular pore silanization, can be achieved with the use of further hydrophobing agents, in particular silanization agents. In particular, it was found that the use of further hydrophobing agents, such as hexamethyldisilazane, can significantly accelerate a required solvent exchange step. For successful silanization, the residual water content of the lyogels should be sufficiently high, preferably above 50 wt. %, based on the weight of the lyogel.

The pH values of the solutions or dispersion of the hydrophobing agent, in particular the silanization solutions, may vary depending on the hydrophobing agents used, in particular the silanization agents. When using trimethylsilanol, diphenylsilanediol, hexamethyldisilazane and hexamethyldisiloxane, as well as other silanols or silanol-forming substances, pH values greater than 8 have been shown to be advantageous. Organic solutions such as nonpolar substances (hexane), aprotic solvents or alcoholic solvents such as methanol, ethanol, isopropanol or the like, to which the previously mentioned hydrophobing agents, in particular silanizing agents, are added, can be used as silanizing solutions. The lyogels can be bathed in or be covered with the solution or dispersion containing the hydrophobing agent, wherein the contact times are up to 30 minutes.

Alternatively, the hydrophobing agents, in particular silanizing agents, can also be used in a compressed phase saturated or partially saturated with organic solvent, in particular the process medium, preferably a $CO_2$ phase, wherein the phase can be both a subcritical gas phase and a supercritical phase. Suitable organic solvents include nonpolar solvents, such as hexane, aprotic solvents, such as dimethyl sulfoxide, or alcoholic solvents, such as ethanol. The solvents used can improve the solubility of the hydrophobing agents, in particular the silanizing agents in the compressed $CO_2$ phase. If the solubility of the hydrophobing agents, in particular the silanizing agents in the process medium, in particular in the compressed $CO_2$, is sufficient, the use of organic solvents can be dispensed with.

During solvent exchange, a $CO_2$-soluble solvent is preferably introduced into the method. The solvent exchange then takes place, for example, at a pressure of 80 bar and 120° C. In this process variant, dissolving the solvent in the $CO_2$ phase is sufficient to displace the water from the pores. Alternatively, the gel stored in particular in the autoclave can be covered with liquid solvent. This is preferably done at a pressure of 160 bar and a temperature of 120° C.

In the context of the present invention, it may be provided that the solvent exchange is carried out in several process stages, in particular in 2 to 15, preferably 3 to 10, more preferably 3 to 4, process stages. In this context, it may be provided that the lyogel is brought into contact with the organic solvent several times. Preferably it is specified that in each process stage at least a part of a mixture of solvent and water or solvent to be replaced is removed from the reactor and new organic solvent is introduced.

Particularly preferably in the context of the present invention, the water content of the lyogel is reduced by the solvent exchange to below 20 vol. %, preferably below 15 vol. %, more preferably below 10 vol. %, based on the total volume of solvent or dispersant.

According to a preferred embodiment, the solvent exchange can be carried out by using water-miscible solvents, such as ethanol, methanol, isopropanol and dimethyl sulfoxide.

Here, it is shown that the residual water content in the spherical lyogel particles should preferably be reduced to less than 10 vol. % before downstream drying is started. Alternatively and equally preferably, hydrophobic organic solvents can also be used for this process step, such as hexane, pentane or cyclohexane, which with sufficient pre-silanization can displace the water stored in the pores from the lyogel. The solvent exchange is preferably carried out in compressed carbon dioxide. Here, the solvent is metered in at a pressure in a reactor, in particular in an autoclave. Surprisingly, it turns out that solvent exchange can be carried out successfully even if the solvent does not come into contact with the gel particles in liquid form. Rather, it is sufficient if the solvent dissolves in the compressed $CO_2$ and thus penetrates the gel and displaces the water from the pores.

According to a preferred embodiment of the present invention, the present invention relates to a method for the preparation of aerogels as described above, wherein
(a) in a first method step a sol, in particular a solution or dispersion of a precursor, is provided,
(b) in a second method step following the first method step (a), the sol is introduced, in particular dripped or sprayed, into an apparatus subjected to a pressure of more than 30 bar, wherein a particulate lyogel is obtained, and
(c) in a third method step following the second method step (b), a solvent exchange and/or a hydrophobing of the lyogel is performed.

The solvent exchange in method step (c) can be carried out over a period of up to 50 minutes, in particular up to 40 minutes, in particular up to 30 minutes. It is particularly preferred in the context of the present invention if the solvent exchange is carried out over a period of from 10 to 50 minutes, in particular from 20 to 40 minutes, preferably from 20 to 30 minutes.

For the above-described embodiment of the method according to the invention, all further embodiments, features and particularities mentioned above apply.

In the context of the present invention, it is usually provided that the lyogel is converted into an aerogel by removing the solvent or dispersant, in particular in a subsequent method step (d).

In this context, it may be provided that subsequent to solvent exchange and/or hydrophobing of the lyogel, in particular following method step (c), the lyogel is converted into an aerogel. In the context of the present invention, it is more preferably the case that the removal of the solvent is carried out at an elevated pressure.

Generally, it is envisaged that in order to convert the lyogel into an aerogel, the lyogel is brought into contact with a drying medium, in particular a drying gas or a supercritical medium. More preferably, the drying medium is carbon dioxide. In this context, it may be provided that the lyogel is continuously or discontinuously brought into contact with the drying medium, in particular the drying gas or the supercritical medium. In the case of discontinuous contacting, the lyogel is brought into contact in an apparatus with a predetermined amount of the drying medium for a preselected period of time. The solvent-contaminated drying medium is then removed and, if necessary, replaced with fresh drying medium until the desired degree of dryness is achieved. In the case of continuous contacting of the lyogel with the drying medium, also known as continuous drying, the lyogel is covered or flowed through by the drying medium in an apparatus until the desired degree of dryness is achieved.

Particularly good results are obtained in this context if the removal of the solvent is carried out at pressures of more than 50 bar, in particular more than 60 bar, preferably more than 70 bar, more preferably more than 74 bar. Similarly, it may be envisaged that the removal of the solvent is carried out in the range from 50 to 180 bar, in particular 55 to 160 bar, preferably 60 to 140 bar, more preferably 70 to 130 bar, particularly preferably 74 to 130 bar.

Now, as far as the temperatures are concerned at which the removal of the solvent is carried out, it has been well proven if this is carried out at elevated temperatures.

Usually, the removal of the solvent is carried out at temperatures above 50° C., in particular above 55° C., preferably above 60° C.

In this context, it may be equally envisaged that the removal of the solvent is carried out at temperatures in the range of from 50 to 160° C., in particular from 70 to 160° C., preferably from 90 to 150° C., more preferably from 100 to 140° C., particularly preferably from 110 to 130° C.

By removing the solvent at the aforementioned pressures and temperatures, an aerogel can be obtained particularly rapidly, in particular by supercritical drying using $CO_2$. Typically, in the context of the present invention, it is envisaged that the solvent is removed from the lyogel within 10 to 50 minutes, preferably 20 to 30 minutes.

The subject-matter of the present invention is preferably a method for the production of an aerogel as described above, wherein
(a) in a first method step a sol, in particular a solution or dispersion of a precursor, is provided,
(b) in a second method step following the first method step (a), the sol is introduced, in particular is dripped or sprayed, into an apparatus subjected to a pressure of more than 30 bar, wherein a particulate lyogel is obtained
(c) optionally, in a third method step following the second method step (b), a solvent exchange and/or hydrophobing of the lyogel is performed, and
(d) in a subsequent method step (d), the lyogel is converted into an aerogel by removal of the solvent or dispersant.

On this particular and preferred embodiment of the present invention, all previously mentioned process features and embodiments, in particular also advantages and special features, can be read without limitation.

Now, as far as the total duration of the previously described method is concerned, the method according to the invention is carried out usually with a total duration over the method steps (a) to (d) with realization of the method step (c) in a period of 1 to 2 hours, preferably 1 to 1.5 hours.

The method according to the invention can be carried out either as a one-pot synthesis or process, i.e. in an autoclave. Equally, however, it is also possible for the individual steps to be carried out in several apparatuses connected in series, in particular autoclaves. Particularly preferably, however, in the context of the present invention, all method steps are carried out at an elevated pressure, in particular in a $CO_2$ atmosphere.

Drying of the particles is preferably carried out in supercritical $CO_2$. The drying time of the spherical gel particles with a size of 0.5 to 5 mm obtained can be reduced to 10 to 30 minutes with the method according to the invention while hydrophobing the lyogels.

In particular, by feeding compressed carbon dioxide as a drying medium, the gas flow can be used for targeted continuous drying of the organogels, and single-stage aerogel particle generation, i.e. in a reactor vessel or reactor, can be ensured.

Due to the spherical particle shape and the typical particle diameters between 0.5 and 5 mm, supercritical drying can be carried out in a time window of up to 30 minutes at a pressure of 120 bar and a temperature of 60 to 120° C.

The figures show according to

Figure 2:
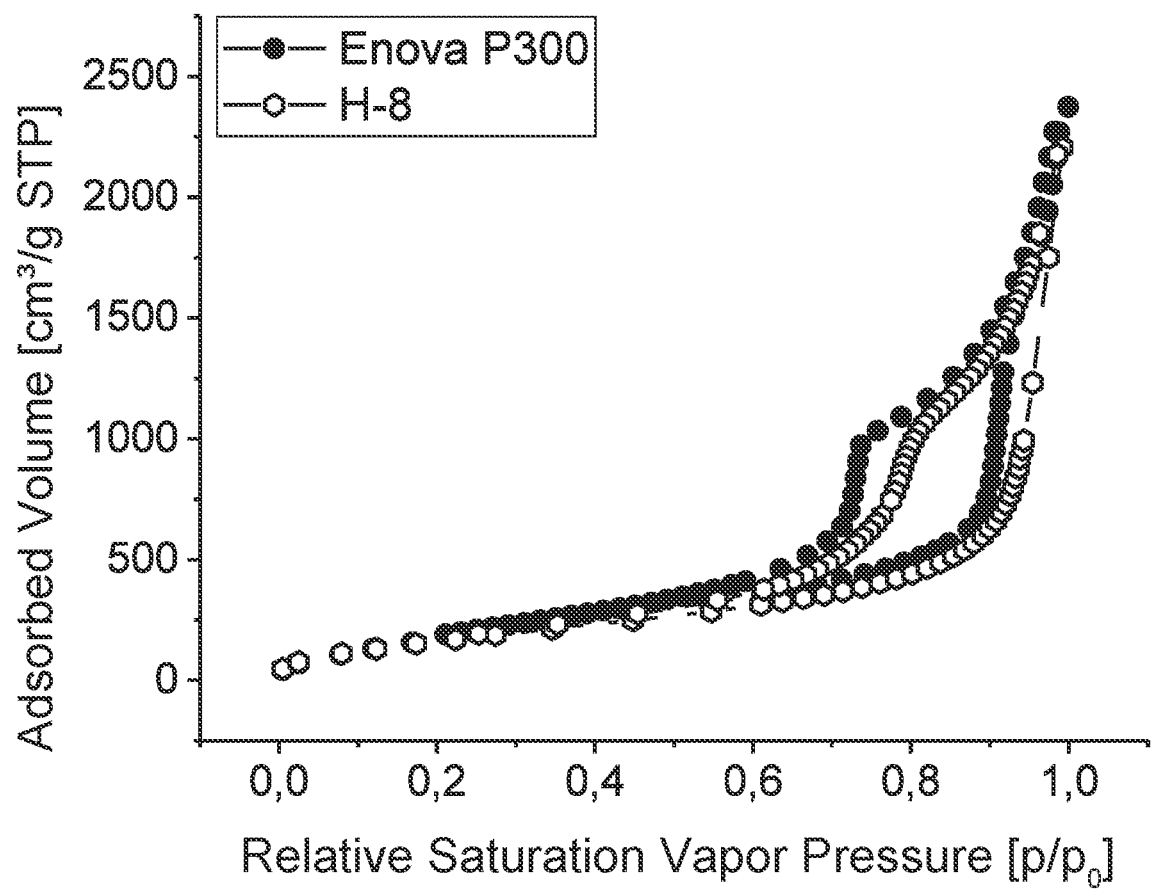

FIG. 1 a cross-section of an apparatus according to the invention for carrying out the method according to the invention, FIG. 2 sorption isotherms of the commercially available aerogel P300 and of the hydrophobized aerogel H-8 according to the invention.

A further subject-matter of the present invention—according to a second aspect of the present invention—is an aerogel, in particular obtainable according to the method previously described, wherein the aerogel is provided in the form of particles having an in particular substantially circular cross-section.

As previously stated, the aerogels according to the present invention are characterized by an in particular circular cross-section, whereby on the one hand the mechanical load-bearing capacity and on the other hand the ability to produce dense sphere packings is significantly increased.

In the context of the present invention, it is usually provided that the aerogel particles are spherical or cylindrical.

Because of their shape, the aerogels according to the invention offer advantages in processing. For example, the spherical aerogels are much easier to mix into powder mixtures. Due to their improved flowability, higher strengths under uniaxial compressive loading and higher packing density compared to conventional aerogel powders, which are based on shapeless or cubic particles, the preferably spherical aerogels according to the invention can be used preferentially in powder blends or powder mixtures, such as thermal insulation plasters.

As far as the particle size of the aerogel particles is concerned, this can naturally vary over a wide range. However, it has been well proven if the aerogel comprises particle sizes in the range of from 0.1 to 10 mm, in particular from 0.2 to 8 mm, preferably from 0.3 to 7 mm, more preferably from 0.5 to 5 mm.

Similarly, it may be envisioned in the context of the present invention that the aerogel particles comprise a monodisperse particle size distribution.

However, it is also possible within the scope of the present invention for the aerogel particles to comprise a polydisperse particle size distribution. In particular, the particle size distribution can be selectively controlled by varying the conditions of spraying or dripping into the reactor.

The aerogel particles according to the invention are highly porous solids. Typically, the aerogel comprises a porosity above 94%, in particular above 95%, preferably above 96%.

Similarly, it may be envisaged that the aerogel comprises a porosity of from 94 to 99.5%, in particular from 95 to 99%, preferably from 96 to 98%.

Furthermore, the aerogels according to the invention comprise high internal surface areas. Thus, it may be provided that the aerogel comprises a BET surface area of at least 500 $m^2/g$, in particular 600 $m^2/g$, preferably 650 $m^2/g$, more preferably 700 $m^2/g$, more preferably 800 $m^2/g$.

Similarly, it may be provided that the aerogel comprises a BET surface area in the range of from 500 to 1,000 $m^2/g$, in particular 600 to 1,050 $m^2/g$, preferably 650 to 1,000 $m^2/g$, more preferably 700 to 950 $m^2/g$, particularly preferably 800 to 900 $m^2/g$.

Now, as far as the thermal conductivity of the aerogel is concerned, this can vary over a wide range. Usually, however, the aerogel comprises very low thermal conductivities in the context of the present invention. Particularly good results are obtained when the aerogel comprises a thermal conductivity of at most 0.025 W/mK, in particular at most 0.022 W/mK, preferably 0.020 W/mK, more preferably 0.019 W/mK.

Typically, the aerogel comprises a thermal conductivity in the range of from 0.012 to 0.025 W/mK, in particular from 0.013 to 0.022 W/mK, preferably from 0.014 to 0.020 W/mK, more preferably from 0.015 to 0.019 W/mK.

Furthermore, it may be provided in the context of the present invention that the aerogel comprises a density in the range of from 0.01 to 0.60 $g/cm^3$, in particular from 0.11 to 0.55 $g/cm^3$, more preferably from 0.12 to 0.50 $g/cm^3$, particularly preferably from 0.13 to 0.50 $g/cm^3$.

For further details on the aerogel according to the invention, reference can be made to the above explanations on the method according to the invention, which apply accordingly with respect to the aerogel according to the invention.

Again, a further subject-matter of the present invention—according to a third aspect of the present invention—is the use of the aerogel described above for insulation purposes, in particular for sound insulation, electrical insulation or thermal insulation, in particular for heat insulation.

For further details on the use according to the present invention, reference can be made to the explanations on the further aspects of the invention, which apply accordingly with respect to the use according to the present invention.

Again, a further subject-matter of the present invention—according to a fourth aspect of the present invention—is the use of an aerogel as previously described for insulating purposes, in particular as or in thermal insulations.

In this context, it may be envisaged that the aerogel is used in loose filling, in a powder mixture or in an insulating composition, for example an insulating plaster.

For further details on the use according to the invention, reference can be made to the above explanations on the further aspects of the invention, which apply accordingly with respect to the use according to the invention.

Again, a further subject-matter of the present invention—according to a fifth aspect of the present invention—is an apparatus for producing aerogel at pressure, wherein the apparatus comprises (a) at least one reactor which can be pressurized,
(b) at least one inlet opening arranged at the reactor, in particular a nozzle, for introducing fluids, in particular liquids, into the reactor, and
(c) at least one outlet opening arranged at the reactor, in particular a sluice, for removing fluids or solids from the reactor.

In the context of the present invention, it may in particular be provided that via at least one inlet opening a sol for producing a lyogel is dripped or sprayed into the reactor. Preferably, however, the reactor comprises a plurality of inlet openings for the introduction of fluids, in particular liquids, namely at least one nozzle for introducing the sol into the reactor and at least one nozzle for introducing further solvents.

The outlet opening of the reactor is preferably in the form of a sluice, in order to be able to quickly remove the lyogel or aerogel from the reactor or also to ensure multiple solvent exchange by covering and then draining the contaminated solvent from the reactor.

According to a preferred embodiment of the present invention, it is provided that the apparatus comprises at least one inlet and/or outlet opening arranged at the reactor for introducing and/or removing gases into and/or from the reactor.

Preferably, the pressure in the reactor is regulated by the amounts of substances, in particular in the gas phase and/or a supercritical phase and/or the temperature. Pressure regulation may be performed, for example, such that gas is introduced into or removed from the reactor.

Furthermore, in the context of the present invention, it is usually provided that the apparatus comprises a device for temperature regulation. Temperature regulation can also be used to specifically influence and control the processes in the reactor and thus in the apparatus as a whole. In particular, it is possible for the reactor to be heated or cooled.

Usually, the apparatus also has a control device, in particular for controlling the pressure and/or the temperature in the reactor.

The apparatus according to the invention can either comprise one reactor or, however, also comprise a plurality of reactors, in particular successive and/or interconnected reactors, so that the individual method steps of the method according to the invention are each carried out in separate reactors. In this way, continuous aerogel production can be carried out.

For further details on the apparatus according to the invention, reference can be made to the above explanations on the further aspects of the invention, which apply accordingly with respect to the apparatus according to the invention.

Finally, again further subject-matter of the present invention—according to a sixth aspect of the present invention—is a method for producing a lyogel by means of a sol-gel process, wherein the production of the lyogel is carried out at least partially at a pressure of more than 30 bar.

With regard to the production of the lyogel, all advantages, particularities and embodiments previously mentioned in the context of the method for the production of an aerogel with respect to the lyogel apply accordingly.

For further details on the method for producing a lyogel according to the present invention, reference can be made to the above explanations on the further aspects of the invention, which apply accordingly with respect to the method for producing a lyogel according to the present invention.

The subject-matter of the present invention will be illustrated below in a non-limiting manner and by way of example with reference to the figure representations as well as the working examples in an exemplary and non-limiting manner.

FIG. 1 schematically shows an apparatus 1 according to the invention with a reactor 2. The reactor 2 comprises several inlet openings, in particular nozzles 3, 4, 5 for the inlet of liquids and/or gases and has an outlet opening 6 for the removal of substances from the reactor 2, such as, for example, aerogels or lyogels or liquid solvents.

To carry out the method according to the invention, a precursor solution 7 is provided, which is placed in a container 8 and is introduced or sprayed into the reactor 2 by means of the inlet opening 7, in particular a nozzle. The precursor solution 7 is in particular an aqueous solution of a silicic acid, a silica sol or a silane hydrolysate, which comprises a pH value in the basic range, preferably between 8.5 and 10.

The reactor 2 preferably comprises an atmosphere 9 of supercritical $CO_2$, in particular with a pressure of 80 to 120 bar and a temperature of 120° C. As a result, an almost spherical and dimensionally stable lyogel 10 forms immediately from the sol. The lyogel particles 10 collect on the bottom of the reactor 2 and can either be removed from the reactor 2 or further processed in the reactor. Preferably, after production of the lyogel 10, a solvent exchange is carried out with simultaneous hydrophobing of the lyogel 10 by means of a suitable organic solvent as well as a hydrophobing agent, in particular a silanizing agent Solvent and hydrophobing agent are introduced into the reactor 2 via the inlet opening 5. Here, it is more preferably the case that the organic solvent is soluble in $CO_2$, in order to enable an enclosing supercritical drying with $CO_2$. Gases, such as $CO_2$, can be introduced into the reactor via the inlet opening 5 and, if necessary, removed again. After solvent exchange has taken place, the lyogel 10 is dried, or in particular by first draining the solvent through the outlet opening 6 and then carrying out supercritical drying of the lyogel using $CO_2$, so that an aerogel is obtained.

The subject-matter of the present invention is explained below with reference to examples of embodiments in a non-limiting manner:

WORKING EXAMPLES

Silica aerogels are produced from silicic acids and examined for their properties:
1. Production of the Aerogels
Preparation of the Starting Material:

The silicic acid is prepared from sodium silicate by means of ion exchangers. The solids content is adjusted to 5 to 10 wt. %, preferably 7 to 8 wt %. For storage of the silicic acid, it can be stabilized at a pH of 1 to 2 using HCl. The pH of the silicic acid is then adjusted to a pH of 8.5 to 10.5 a few minutes before use by adding $NH_3$.

Method Description:

The silicic acid produced is dripped into a container pressurized with $CO_2$ by means of a high-pressure pump. Depending on the capillary selected, droplets with a diameter of 2 to 6 mm are produced. The pressure inside the container can be varied between 30 bar and 300 bar for gelation, with a minimum temperature of 60° C. The droplets are formed as soon as they enter the container. Gelation occurs immediately when the silicic acid enters the pressure vessel due to the change in pH caused by $CO_2$ diffusing into the water.

The hydrogel particles in spherical form collect at the bottom of the vessel. The water present in the hydrogels interferes with the drying process and must therefore be exchanged for a suitable $CO_2$-soluble solvent. For this purpose, the pressure is preferably set in the supercritical range, for example to 140 bar, and ethanol containing 5% hexamethyldizisilazane (HDMZ) is metered into the vessel. This initially leads to the formation of a liquid ethanol phase at the bottom of the vessel and a $CO_2$ phase saturated with ethanol. It has been shown that both covering of the gels with the liquid ethanol-HDMZ mixture and exclusive contact of the gels with the ethanol-saturated gas phase results in sufficient solvent exchange. The simultaneous addition of HDMZ leads to hydrophobing of the gels. After a residence time of 30 minutes, the liquid ethanol is drained from the vessel. This is followed by two more cycles of adding ethanol to the vessel with the aim of saturating the $CO_2$ phase with ethanol. After 20 minutes each, the saturated gas phase and the liquid ethanol phase are exchanged. It has been shown to be particularly advantageous that the first solvent exchange is carried out in such a way that the gels are covered with the liquid ethanol phase.

At the end of the solvent exchange under pressure, the gels contain less than 5% water and can be dried supercritically. For this purpose, the pressure in the column is preferably varied for 45 minutes between 100 to 160 bar, preferably 120 bar and 160 bar, at a vessel temperature of 80° C. to 120° C. The supercritical drying can be either continuous or discontinuous. In the discontinuous one, the gel is brought into contact with a defined quantity of the drying medium, in particular carbon dioxide, in the column and, after an adjustable residence time, the drying medium enriched with solvent is partially or completely removed from the column and replaced by fresh drying medium, wherein the process is repeated as often as necessary until the desired degree of drying is achieved. Alternatively, in continuous drying, the column can be continuously flushed with the drying medium, in particular carbon dioxide. In continuous drying, the pressure can either be kept constant or varied, in particular varied periodically. After completion of the drying step, dry spherical aerogels can be removed.

2. Properties of the Aerogels

By investigating the solvent exchange in hydrogels using compressed carbon dioxide, the influence of silanizing agents and their time of addition during the manufacturing process is examined.

It is found that the addition of silanizing agents prior to gel formation comprises positive effects on the forming gel matrix. The silanizing agent is incorporated into the forming Si—O network. This leads to partial elastification of the network, which is reflected in smaller pore radii and accelerated solvent exchange and lower shrinkage.

To evaluate the degree of hydophobicity, the prepared aerogel samples are stored in liquid water and 98% relative humidity.

As a result, it is found that pre-silanization is beneficial for structural build-up but often insufficient for complete silanization. By post-silanization during the drying process, only small amounts of moisture are absorbed in the pores of the aerogels over a storage period of 4 weeks in water

TABLE 1

Overview of the results from the nitrogen adsorption BET.

| Samples | Porosity [%] | BET surface area [m²/g] | Average pore radius [nm] | Remark |
|---|---|---|---|---|
| ENOVA 3110 | 93.78 | 696.3 | 13 | Reference |
| ENOVA P-300 | 94.80 | 754.6 | 19 | Reference |
| Aerogel A-1 | 96.45 | 707.8 | 29 | Unsilanized |
| Aerogel A-6 | 95.79 | 802.2 | 24 | Pre-silanized |
| Aerogel A-7 | 94.95 | 866.7 | 24 | Pre-silanized |
| Aerogel A-8 | 96.04 | 728.7 | 23 | Pre-silanized |
| Aerogel H-6 | 97.07 | 705.5 | 18 | Pre-silanized + Post-silanized |
| Aerogel H-7 | 96.63 | 673.1 | 15 | Pre-silanized + Post-silanized |
| Aerogel H-8 | 97.23 | 656.3 | 21 | Pre-silanized + Post-silanized |

Samples A5 to A8 are pre-silanized using hexadimethyldisilazane at pH values of 7.0, in contrast samples H-5 to H-8 are pre- and post-silanized. As a result, the average pore radius can be varied between 30 and 15 nm. The shrinkage due to the drying performed could be reduced for the samples with pre- and post-silanization. In addition, H-8 comprises the lowest shrinkage and the highest porosity.

Thermal Conductivity

For the determination of the thermal conductivity a device from C3 Prozess und Analysetechnik GmbH of the type Hot Disk with a sensitivity up to 0.005 W/m*K is used. The Hot Disk sensor here consists of a nickel double spiral, which serves both as a heat source and for measuring the temperature rise during the measurement

TABLE 2

Overview of results from thermal conductivity measurements

| Sample | Measured thermal conductivity [W/m*K] | Calculated thermal conductivity [W/m*K] |
|---|---|---|
| Aerogel UMSICHT | 0.019 to 0.032 | 0.0169 |

Pore Volume and Density

To determine the density and pore volume, investigations were carried out using mercury porosimetry. Here, the sample is pressurized up to 400 MPa, which destroys the sample, but thereby also allows a complete detection of the inner pore volume.

TABLE 3

Overview of results from mercury porosimetry

| Sample | Density [g/cm³] | Porosity [%] | Average pore radius [nm] | Remark |
|---|---|---|---|---|
| ENOVA 3110 | 0.147 | 94.3 | 76 | Reference |
| ENOVA P-300 | 0.142 | 95.1 | 75 | Reference |
| Aerogel 160222 | 0.133-0.149 | 91.2-97.3 | 68-111 | |

The commercially available, subcritically dried and hydrophobized aerogel Enova P300 (Cabot Corporation), which comprises an average density of 150 kg/m3 according to the data sheet, and the aerogel Enova 3110 (Cabot Corporation) are used as reference.

The measured values of the analogously performed sorption measurement are shown together with the hydrophobic aerogel H-8 in FIG. 2F. Both aerogels comprise a similar course of the isotherms. Likewise, no constant value of the adsorbed volume is achieved. This behavior shows that the P300 also contains pores that are not detected by the sorption measurement and the evaluation according to BET or BJH. In addition, the P300 comprises an extended hysteresis at lower pressures, which is caused by an increased inhibition of the desorption of nitrogen.

TABLE 4

Properties derived from the sorption isotherms of the commercial aerogel P300 and sample H-8

| Sample | $S_{BET}$ [m$^2$/g] | $V_{P, Sorption}$ [cm$^3$/g] | $d_{P, Geo}$ [nm] | $d_{P, BET}$ [nm] | $d_{P, BJH, A}$ [nm] | $d_{P, BJH, D}$ [nm] |
|---|---|---|---|---|---|---|
| P300 | 754.6 | 3.61 | 37 | 19 | 25 | 8 |
| H-8 | 656.3 | 3.38 | 97 | 20.6 | 40 | 10 |

REFERENCE SIGNS 1 apparatus
2 reactor
3 inlet opening
4. inlet opening
5. inlet opening
6. outlet opening
7. precursor solution
8. container
9. carbon dioxide atmosphere
10. lyogel particle

The invention claimed is:

1. A method for producing a silica aerogel, comprising:
  (a) introducing droplets of a sol into an apparatus subjected to a pressure of more than 30 bar to form a particulate lyogel, wherein:
    the sol has a pH greater than 7 and is a solution or dispersion of a precursor in a solvent or dispersant,
    the apparatus contains compressed carbon dioxide and formation of the particulate lyogel is initiated by a pH shift of the sol due to the compressed carbon dioxide, and
    the sol has not been pre-gelled or partially gelled by an acid or base before being introduced into the apparatus; and
  (b) following step (a), performing a solvent exchange of the lyogel.

2. The method according to claim 1, wherein:
  the pressure in step (a) is more than 40 bar; and/or
  step (a) is carried out at a temperature above 50° C.

3. The method according to claim 1, further comprising converting the lyogel into an aerogel by removing a solvent or dispersant of the solvent exchange of step (b) from the lyogel at a pressure of more than 50 bar.

4. The method according to claim 1, wherein the precursor is selected from silicic acids, colloidal silicic acid, colloidal silica, silanes, silica sols, tetraalkoxysilanes, siloxanes and mixtures thereof.

5. The method according to claim 1, wherein the sol comprises a hydrophobing silanizing agent.

6. The method according to claim 1, wherein the solvent exchange occurs by contacting the lyogel with an organic solvent.

7. The method according to claim 6, wherein the organic solvent is brought into contact with the lyogel together with a hydrophobing agent.

8. The method according to claim 7, further comprising, subsequent to contact with the organic solvent and hydrophobing agent, converting the lyogel into an aerogel.

* * * * *